United States Patent
Farrow et al.

(10) Patent No.: US 7,874,283 B2
(45) Date of Patent: Jan. 25, 2011

(54) FUEL DELIVERY DEVICE AND METHODS THEREFOR

(75) Inventors: Timothy J. Farrow, Fort Collins, CO (US); Kyle E. Carter, Fort Collins, CO (US)

(73) Assignee: Injection Solutions, LLC, Fort Collins, CO (US)

( * ) Notice: Subject to any disclaimer, the term of this patent is extended or adjusted under 35 U.S.C. 154(b) by 108 days.

(21) Appl. No.: 12/366,062

(22) Filed: Feb. 5, 2009

(65) Prior Publication Data

US 2009/0194073 A1    Aug. 6, 2009

Related U.S. Application Data

(60) Provisional application No. 61/063,655, filed on Feb. 5, 2008.

(51) Int. Cl.
*F02M 61/14* (2006.01)
*F02M 61/18* (2006.01)

(52) U.S. Cl. ....................................... 123/470

(58) Field of Classification Search ................ 123/470, 123/527, 531, 585, 590, 468, 469, 456, 27 GE; 239/533.12, 406; 285/332.3
See application file for complete search history.

(56) References Cited

U.S. PATENT DOCUMENTS

| | | | | |
|---|---|---|---|---|
| 3,804,333 A | * | 4/1974 | Kramer et al. | 239/124 |
| 5,170,766 A | * | 12/1992 | Haas et al. | 123/531 |
| 5,713,336 A | | 2/1998 | King et al. | |
| 5,832,905 A | | 11/1998 | King et al. | |
| 5,881,701 A | | 3/1999 | King et al. | |
| 2005/0011965 A1 | * | 1/2005 | Casey | 239/5 |

FOREIGN PATENT DOCUMENTS

DE        3605856 A1 *  8/1987

* cited by examiner

*Primary Examiner*—Mahmoud Gimie
(74) *Attorney, Agent, or Firm*—Holland & Hart LLP

(57) ABSTRACT

A fuel delivery device including a fuel injector adapter and a side-port fuel injector. The fuel injector adapter includes a body portion with first and second connector portions extending therefrom. An injector port is formed in the body portion and configured to receive a side-port injector, wherein the injector port includes a plurality of concentric bores and at least one annular region adapted for receiving a fuel flow associated with the injector. A first passageway is formed in the first connector portion and extends along a first longitudinal axis and intersects the port. A second passageway is formed in the second connector portion and extends along a second longitudinal axis. The second passageway is in fluid communication with the annular region.

20 Claims, 5 Drawing Sheets

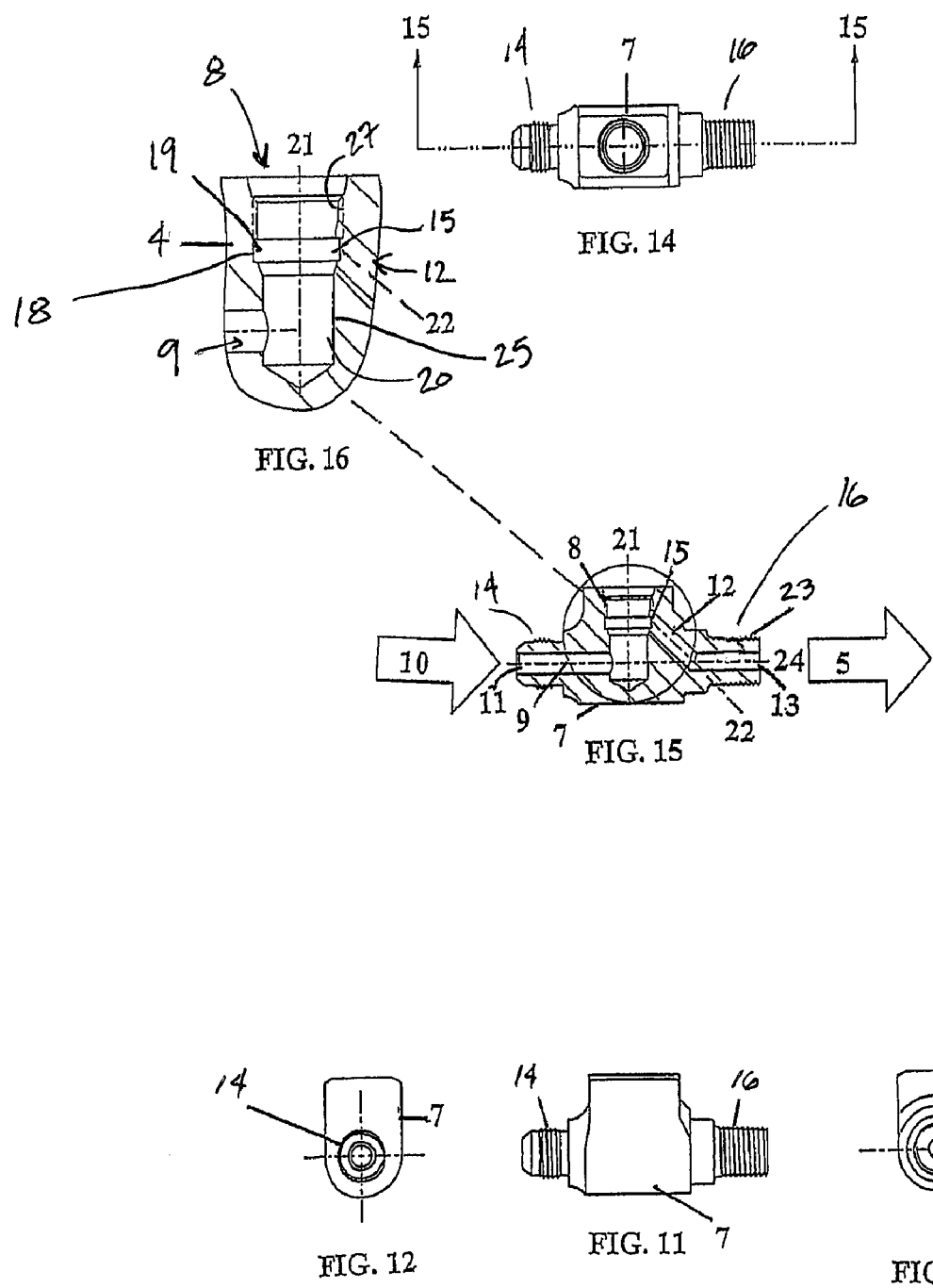

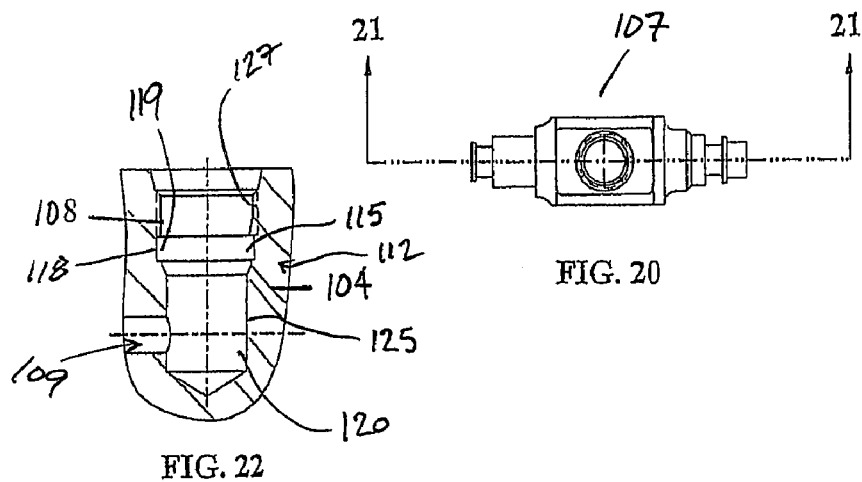
FIG. 22
FIG. 20
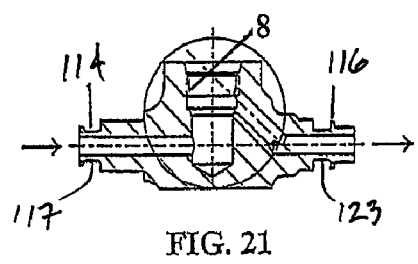
FIG. 21
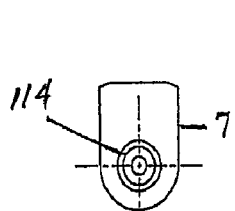
FIG. 18
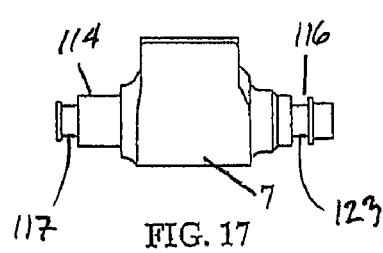
FIG. 17
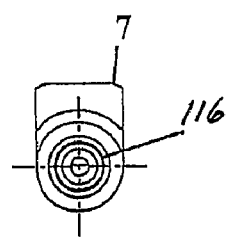
FIG. 19

FUEL DELIVERY DEVICE AND METHODS THEREFOR

BACKGROUND

Automobile engines have been fueled by various means over the years. Carburetors were initially used with success for many years. As emissions standards and fuel mileage became more of a concern, fuel injection systems began to appear on engines. For example, throttle body injection was an improvement over the carburetor in that it was able to use closed-loop technology to more accurately fuel the engine over a wider range of operating conditions. A throttle body injection system, however, utilized a single point of injection, usually within a throttle body. As such, throttle body systems still had less than optimum fuel mixing and distribution characteristics. Multi-point fuel injection systems overcame this by providing an injector for each cylinder of the engine. Generally, each fuel injector is received in an injection port located either in an intake manifold runner or in the cylinder head. The injector is connected to a fuel supply such as a fuel rail. An engine control module typically sends a pulse width modulated (PWM) signal to the injector to control the injector's fuel flow.

Conventional fuel injectors are generally fixed with respect to the maximum amount of fuel that can be delivered from any one fuel injector to the combustion chamber. This amount can be insufficient to satisfy the fuel demand for particular constructional forms of the engine. For example, performance modifications or conversion to a different fuel such as methanol may require a greater mass of fuel than the original injector can supply. The conventional solution to this problem has been the use of multiple fuel injectors along with the corresponding multiplicity of flow paths, connectors, seals and computer controlled fuel injector drivers per combustion chamber of the engine. The use of multiple injectors can increase cost and can reduce reliability of a fuel delivery configuration overall.

Another drawback of conventional fuel injectors can be that as the amount of fuel a fuel injector delivers increases, the size of the fuel injector correspondingly increases. Increased size of the fuel injector can increase the distance between the fuel rail and the manifold resulting in a fuel delivery configuration which cannot be used or can be impractical to use as to certain applications, as it may interfere with other engine equipment or the vehicle's hood, for example.

SUMMARY

The exemplary embodiments described herein are directed to a fuel delivery device including a fuel injector adapter and a side-port fuel injector. The fuel injector adapter includes a body portion with first and second connector portions extending therefrom. An injector port is formed in the body portion and configured to receive a side-port injector, wherein the injector port includes a plurality of concentric bores and at least one annular region adapted for receiving a fuel flow associated with the injector. The annular region may include a groove.

A first passageway is formed in the first connector portion and extends along a first longitudinal axis and intersects the port. A second passageway is formed in the second connector portion and extends along a second longitudinal axis. The second passageway is in fluid communication with the annular region. The first and second longitudinal axis may be parallel to each other. Furthermore, the first and second longitudinal axis may be collinear and extend orthogonally with respect to an injector port axis.

The second passageway may be connected to the annular region by a third passageway extending laterally from the second passageway. The third passageway may extend laterally from the second passageway at an angle of between 35 and 55 degrees.

The first and second connector portions may include threads. Alternatively, the first and second connector portions may each include a groove formed therearound that is sized and configured to receive a selected o-ring thereon.

Also contemplated, is a method for changing the mass of fuel supplied to an internal combustion engine that utilizes a conventional in-line fuel injector system, wherein the injector is connected to a fuel supply and an injection port. The method includes removing the in-line fuel injector from the fuel supply and the manifold port and replacing it with a side-port injector with flow characteristics different than the in-line injector. For example, the side-port injector could have a different maximum flow rate, different turndown ratio, and/or better leakage performance. The side-port injector is then connected to the fuel supply at its inlet and the outlet of the side-port injector is connected to the injection port.

The side-port injector may have a maximum flow capacity that is greater than the in-line fuel injector or less than that of the in-line fuel injector. Indeed, the side-port injector may be configured for a different fuel than the in-line injector, such as a gaseous fuel or a different liquid fuel, for example, methanol.

The foregoing and other features, utilities, and advantages of the fuel delivery device will be apparent from the following more particular description of the embodiments as illustrated in the accompanying drawings.

A BRIEF DESCRIPTION OF THE DRAWINGS

The accompanying drawings, which are incorporated in and constitute a part of this specification, illustrate multiple embodiments of a fuel delivery device and together with the description, serve to explain the principles thereof. Like items in the drawings are generally referred to using the same numerical reference.

FIG. 11 is a side view in elevation of the fuel injector adapter shown in FIGS. 1-5;

FIG. 12 is an end view in elevation of a first end of the fuel injector adapter shown in FIG. 11;

FIG. 13 is an end view in elevation of a second end of the fuel injector adapter shown in FIGS. 11 and 12;

FIG. 14 is a top plan view of the fuel injector adapter shown in FIGS. 11-13;

FIG. 15 is a cross-sectional view of the fuel injector adapter taken about line 15-15 as shown in FIG. 14;

FIG. 16 is an enlarged partial cross section of the injector port as shown in FIG. 15;

FIG. 17 is a side view in elevation of the fuel injector adapter shown in FIGS. 6-10;

FIG. 18 is an end view in elevation of a first end of the fuel injector adapter shown in FIG. 17;

FIG. 19 is an end view in elevation of a second end of the fuel injector adapter shown in FIGS. 17 and 18;

FIG. 20 is a top plan view of the fuel injector adapter shown in FIGS. 17-19;

FIG. 21 is a cross-sectional view of the fuel injector adapter taken about line 21-21 as shown in FIG. 20;

FIG. 22 is an enlarged partial cross section of the injector port as shown in FIG. 21;

DETAILED DESCRIPTION

Figures 1, 2:
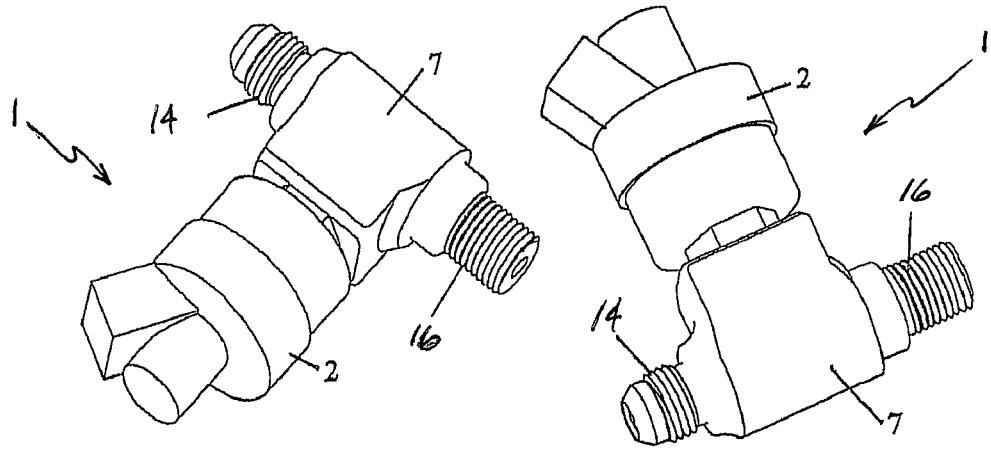
FIG. 1 is a perspective view of a first side of a fuel delivery device according to a first exemplary embodiment.
FIG. 2 is a perspective view of a second side of the fuel delivery device shown in FIG. 1.
Figure 3:
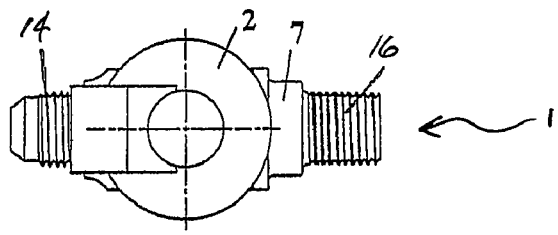
FIG. 3 is a top plan view of the fuel delivery device shown in FIGS. 1 and 2.
Figures 4, 5:
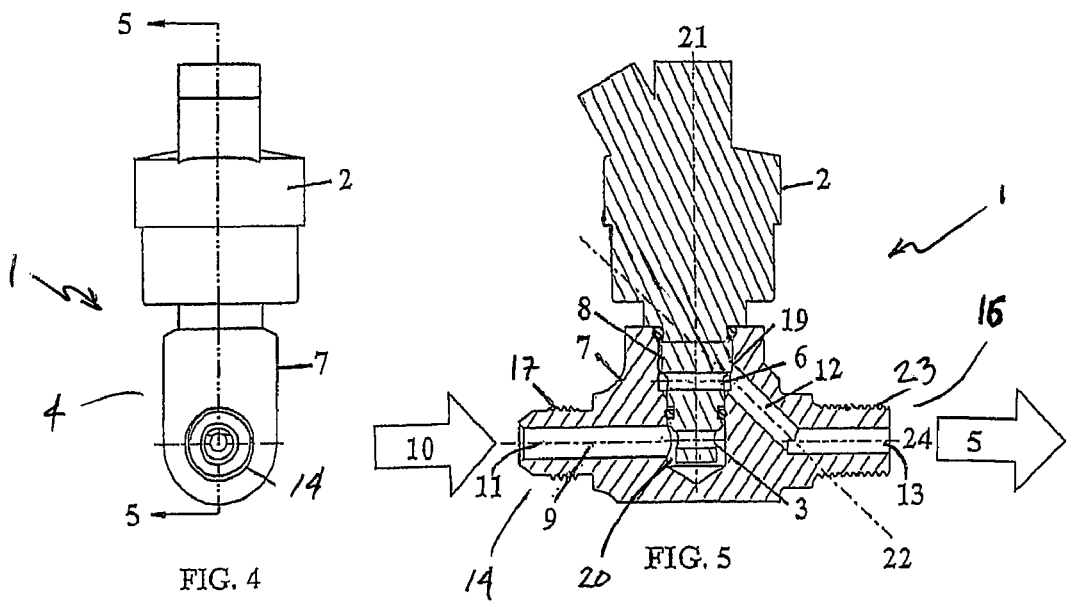
FIG. 4 is an end view in elevation of the fuel delivery device shown in FIGS. 1-3.
FIG. 5 is a cross-sectional view of the fuel delivery device taken about line 5-5 as shown in FIG. 4.
Figures 6, 7:
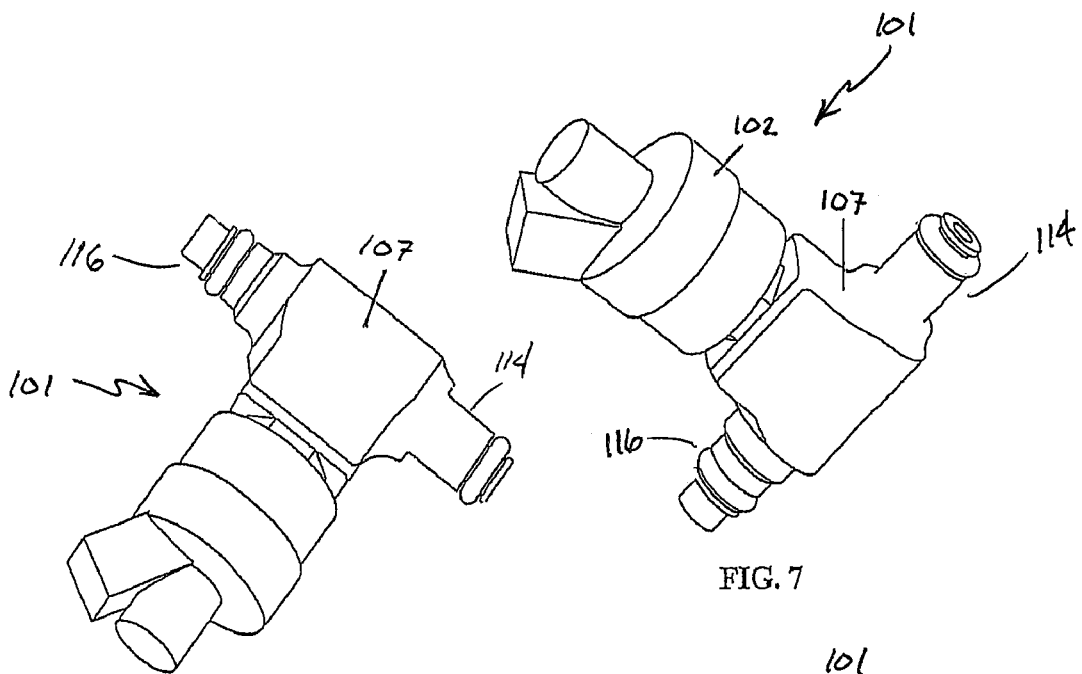
FIG. 6 is a perspective view of a first side of a fuel delivery device according to a second exemplary embodiment.
FIG. 7 is a perspective view of a second side of the fuel delivery device shown in FIG. 6.
Figure 8:
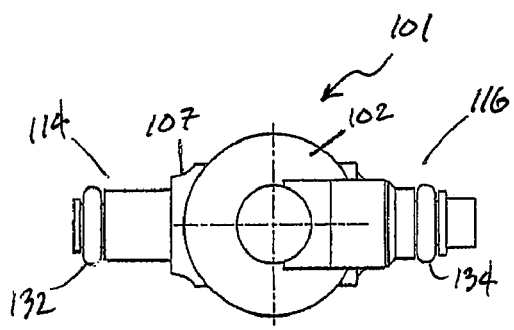
FIG. 8 is a top plan view of the fuel delivery device shown in FIGS. 6 and 7.
Figures 9, 10:
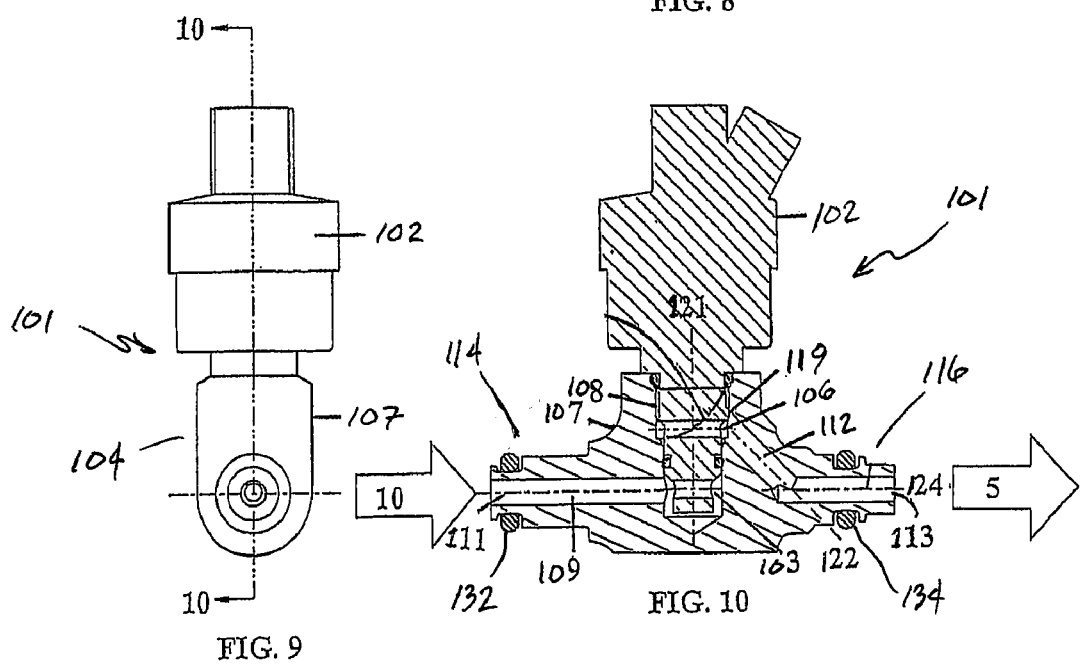
FIG. 9 is an end view in elevation of the fuel delivery device shown in FIGS. 6-8.
FIG. 10 is a cross-sectional view of the fuel delivery device taken about line 10-10 as shown in FIG. 9.

The replacement of an original equipment fuel injector with a different style fuel injector which delivers a substantially greater amount of fuel was, until now, impossible or impractical. For example, the original equipment injector on many vehicles is an in-line or top-feed style fuel injector. As a non-limiting example, the Bosch series of fuel injectors including but not limited to model numbers 0280150846, 0280150842, 0280150563 have a widespread use in fuel delivery systems of internal combustion engines. Understandably, the fuel rails (at the delivery side) and the intake manifolds are correspondingly configured to receive in-line style injectors, particularly the Bosch series injectors (see prior art FIG. 23). Accordingly, these particular fuel rails could not until now be retrofitted directly with other types of fuel injectors, such as a side-port style injector. Provided herein is a new fuel delivery device that may be used with the existing fuel supply line and injection port configuration of many vehicles' engines, thus resolving the limitations of original equipment injectors.

Referring initially to FIGS. 1-5, a first exemplary embodiment of the fuel delivery device 1 may include a fuel injector 2. Fuel injectors suitable for use in the disclosed fuel delivery device include a fuel inlet 3 and deliver at timed intervals an amount of fuel 5 to a fuel outlet 6. The amount of fuel 5 delivered to the fuel outlet 6 becomes entrained in a gas flow "F" received by an intake manifold 42 (see FIG. 24) of the engine (not shown). This style injector is referred to as a side-port or side-feed injector. As a non-limiting example, fuel injector models SP010, SP014, SP021, and SP051 available from Clean Air Power, Inc., San Diego, Calif. can be utilized with the disclosed fuel delivery device. Fuel injectors of this configuration allow delivery of an amount of fuel 5 from the fuel outlet 6 which can be substantially greater as compared to the Bosch series of injectors above-described which provide a low impedance fuel injector which can deliver an amount of fuel 5 of about 1600 cc/min at 43.5 PSI (3 BAR) (Bosch Part No.: MOTR-04655). While high discharge injectors such as those available from Clean Air Power provide a specific example, the invention is not so limited and a numerous and wide variety of fuel injectors, which include fuel inlets 3 and fuel outlets 6 of similar configuration can also be utilized with the device.

Referring to FIGS. 11-16, this embodiment of the fuel delivery device 1 includes a fuel injector adapter 7, which includes a body portion 4. Body portion 4 includes an injector port 8 extending along a port axis 21 and configured to receive an injector of the above-described type. Port 8 includes a plurality of concentric bores such as 18 and 25 and a plurality of corresponding annular regions such as 19 and 20 for receiving fuel flow associated with the injector. Port 8 may also include one or more grooves, for example groove 15, for enlarging one or more of the annular regions. Injector 2 is retained in port 8 with threads 27.

A fuel inlet conduit or passageway 9 extends along inlet axis 11 and provides an inlet flow path to deliver fuel 10 from a conventional fuel tank (not shown) through a supply line or fuel rail to the fuel inlet 3 of the fuel injector 2. A fuel inlet connector portion 14 includes an external surface which mates with the supply line or fuel rail. As shown in FIGS. 1-5, 11 and 14, fuel inlet connector portion 14 may include a spiral thread 17 which rotatingly engages a mating spirally threaded supply line or fuel rail connector.

The fuel injector adapter 7 further includes a fuel outlet conduit or passageway 13 that extends along outlet axis 24 and delivers the amount of fuel 5 delivered from the fuel outlet 6 of the fuel injector 2 to the intake manifold (not shown) of the engine (not shown). The fuel outlet passageway 13 provides an outlet flow path. A fuel outlet connector portion 16 includes an external surface configured to mate with the intake manifold of the engine (not shown). As shown in FIGS. 1-5, 11 and 14, the fuel outlet connector portion 16 may include a spiral thread 23, which rotatingly engages a mating spirally threaded injector port located in the intake manifold or cylinder head (not shown).

The fuel injector adapter 7 may include an inclined passage 12 that connects outlet passageway 13 to annular region 19. Annular region 19 is configured to receive the amount of fuel 5 intermittently discharged from the fuel outlet 6 of the fuel injector 2. The inclined passage 12 extends along an inclined axis 22 and may be inclined at an angle of about 45 degrees relative to the longitudinal port axis 21 of the fuel injector 2. While the particular embodiment of the fuel injector adapter 7 shown in the Figures shows the inclined passage 12 having an inclined passage axis 22 with an angle of about 45 degrees to port axis 21 of fuel injector 2, the invention is not so limited and the inclined passage 12 may have an angle of between about 35 degrees and about 55 degrees. Also, rather than an inclined passage 12, a passage in substantially parallel relation to port axis 21 is also contemplated. It is further contemplated that the flow could be reversed from that shown in the embodiments. Also, inclined passageway could be associated with the inlet 3 of injector 2 instead of the outlet 6. The fuel delivery housing 7 can further provide a return line (not shown) which leads from the fuel injector 2 to the fuel tank (not shown).

Advantageously, inclined passageway 12 is angled at about 45 degrees which couples to the outlet passageway 13 as shown in the Figures thereby inducing highly turbulent mixing of the amount of fuel 5 delivered from the fuel outlet 6 of the fuel delivery housing 7 to the inclined passage 12 resulting in an amount of fuel 5 exiting from fuel outlet passageway 13 of the fuel outlet conduit connector 16 as a dispersion of small droplets. Injector adapter 7 may be comprised of any suitable material such as aluminum, steel, or plastic. Preferably, injector adapter 7 is anodized 6061-T6 aluminum.

A second exemplary embodiment of a fuel delivery device 101 is shown in FIGS. 6-10 and 24. This embodiment is similar to the embodiment described above with respect to FIGS. 1-5. In this embodiment, however, connector portions 114 and 116 are configured with o-ring style or quick-connect type connections. In particular, injector adapter 107 (see FIGS. 17-22) includes an inlet connector portion 114 that includes a groove 117 sized and configured to receive an o-ring 132. Similarly, outlet connector portion 116 includes groove 123 sized and configured to receive o-ring 134. O-rings 132 and 134 may be formed of any suitable material appropriate for the fuel being used. For example, fluorosilicone o-rings are preferred for use with methanol.

Figure 23:
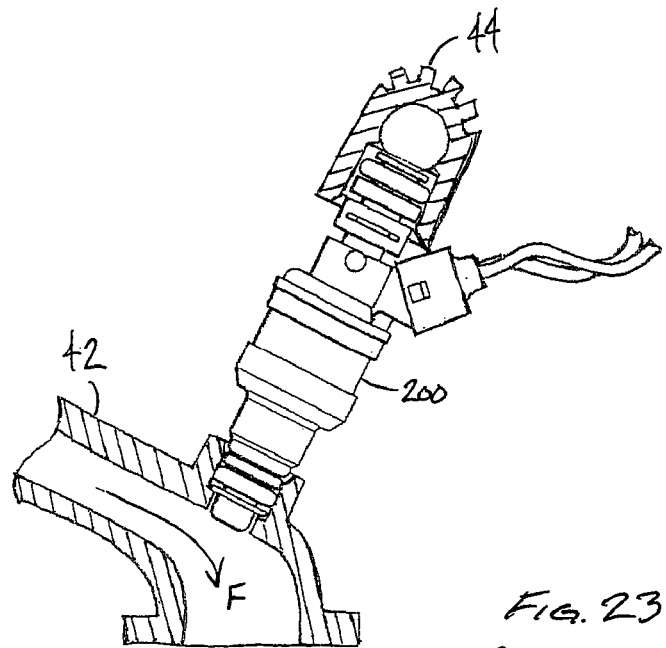
FIG. 23 is a partial cross-sectional view of a conventional injector disposed between a fuel rail and intake manifold runner.
Figure 24:
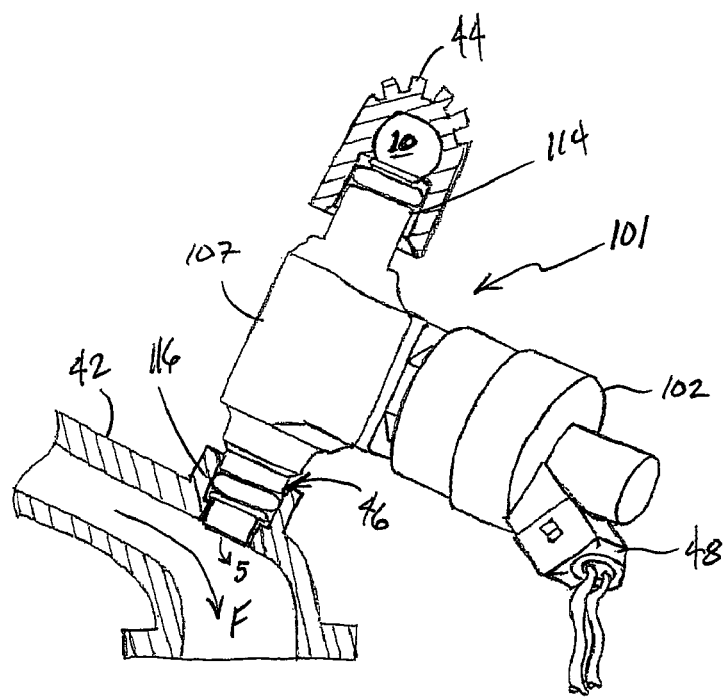
FIG. 24 is a partial cross-sectional view of a fuel delivery device according to the second exemplary embodiment connected to a fuel rail and intake manifold runner.

It can be appreciated with reference to FIG. 24 that fuel delivery device 101 conveniently mates with a conventional fuel injection system in place of an in-line style fuel injector 200 (see FIG. 23). Outlet connector portion 116 mates with injector port 46 which, in this case, is formed in intake manifold runner 42. In addition, inlet connector portion 114 mates with fuel rail 44. Furthermore, the o-rings may be removed from injector 200 and used on injector adapter 107. To further ease the installation of fuel delivery device 101, injector 102 may be adapted to mate with the existing electrical connector 48.

It should be understood that fuel 10 may be any fuel suitable for use in an internal combustion engine. Non-limiting examples of fuel that may be used with the fuel delivery device are: gasoline, alcohol (such as methanol or ethanol or a combination thereof), diesel fuel, pilot fuel, lubricating oil, or the like. Furthermore, gaseous fuels are also contemplated such as natural gas or hydrogen, for example.

Methods relating to the above described fuel delivery device are also contemplated. The methods thus encompass the steps inherent in the above described mechanical structures. Broadly, one method could include the step of removing an in-line fuel injector from the fuel supply and the manifold port of a conventional in-line fuel injection system and replacing it with a side-port injector with a flow capacity different than the in-line injector by connecting the fuel supply to the inlet of the side-port injector, and connecting an outlet of the side-port injector to the injection port.

Accordingly, the fuel delivery device has been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

We claim:

1. A fuel injector adapter, comprising:
   a. a body portion;
   b. first and second connector portions extending from said body portion;
   c. an injector port formed in said body portion that is configured to receive a side-port injector, wherein said injector port includes a plurality of concentric bores and at least one annular region adapted for receiving a fuel flow associated with the injector;
   d. a first passageway formed in said first connector portion and extending along a first longitudinal axis and intersecting said port; and
   e. a second passageway formed in said second connector portion and extending along a second longitudinal axis, said second passageway being in fluid communication with said annular region.

2. A fuel injector adapter according to claim 1 wherein said first and second longitudinal axis are parallel.

3. A fuel injector adapter according to claim 1 wherein said first and second longitudinal axis are collinear.

4. A fuel injector adapter according to claim 3 wherein said second passageway is connected to said annular region by a third passageway extending laterally from said second passageway.

5. A fuel injector adapter according to claim 4 wherein said annular region includes a groove.

6. A fuel injector adapter according to claim 4 wherein said third passageway extends laterally from said second passageway at an angle of between 35 and 55 degrees.

7. A fuel injector adapter according to claim 4 wherein said injector port extends along a port axis and said first and second longitudinal axis are orthogonal to said port axis.

8. A fuel injector adapter according to claim 4 wherein said first and second connector portions include threads.

9. A fuel injector adapter according to claim 4 wherein said first and second connector portions each include a groove formed therearound that is sized and configured to receive a selected o-ring.

10. A fuel injector adapter according to claim 9 wherein said first and second connector portions each include an o-ring disposed in its respective said groove.

11. A fuel delivery device, comprising:
   a. a fuel injector adapter including:
      i. a body portion;
      ii. first and second connector portions extending from said body portion;
      iii. an injector port formed in said body portion that is configured to receive a side-port injector, wherein said injector port includes a plurality of concentric bores and at least one annular region adapted for receiving a fuel flow associated with the injector;
      iv. a first passageway formed in said first connector portion and extending along a first longitudinal axis and intersecting said port; and
      v. a second passageway formed in said second connector portion and extending along a second longitudinal axis, said second passageway being in fluid communication with said annular region; and
   b. a side-port fuel injector.

12. A fuel delivery device according to claim 11 wherein said first and second connector portions each include a groove formed therearound that is sized and configured to receive a selected o-ring.

13. A fuel delivery device according to claim 12 wherein said first and second connector portions each include an o-ring disposed in its respective said groove.

14. A method for changing the mass of fuel supplied to an internal combustion engine that utilizes at least one in-line fuel injector connected to a fuel supply and an injection port, the method comprising:
   a. removing the in-line fuel injector from the fuel supply and the manifold port;
   b. providing a side-port injector with flow characteristics different than the in-line injector;
   c. connecting said fuel supply to the inlet of said side-port injector; and
   d. connecting an outlet of said side-port injector to the injection port.

15. The method according to claim 14 wherein said side-port injector has a maximum flow capacity greater than the in-line fuel injector.

16. The method according to claim 14 wherein said side-port injector has a maximum flow capacity less than the in-line fuel injector.

17. The method according to claim 14 wherein said side-port injector is configured for a different fuel than the in-line injector.

18. The method according to claim 17 wherein said sideport injector is configured for a gaseous fuel.

19. The method according to claim 17 wherein said sideport injector is configured for a liquid fuel.

20. The method according to claim 19 wherein said sideport injector is configured for methanol.

* * * * *